July 10, 1923.　　　　　　　　　　　　　　　　　　1,461,410
J. H. ALDRICH
NUT SHELLING MACHINE
Filed Sept. 20, 1921　　　　　2 Sheets-Sheet 1

WITNESS
J. R. Gardner

INVENTOR
J. H. ALDRICH
BY
Joseph B. Gardner
his ATTORNEY

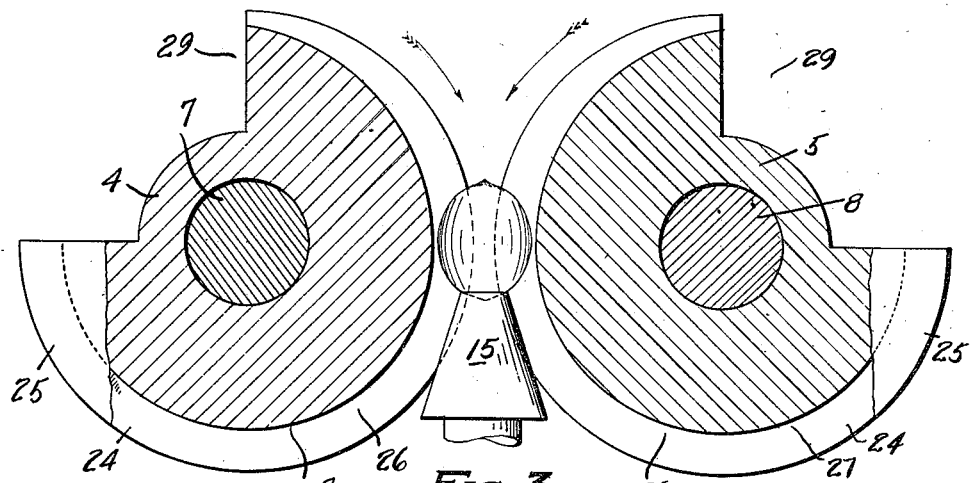
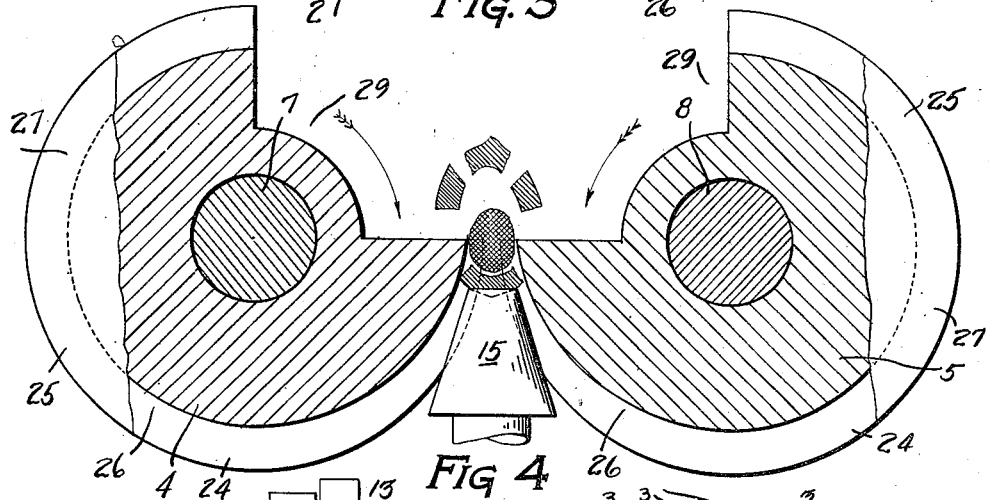
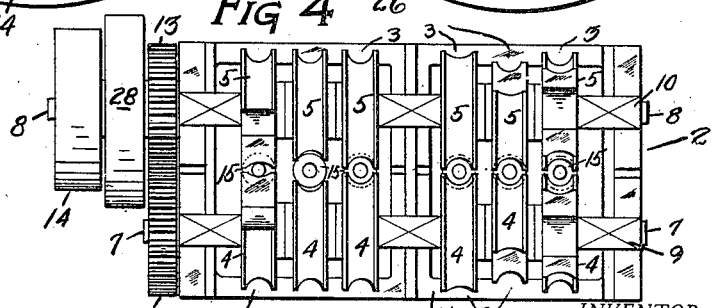

Patented July 10, 1923.

1,461,410

UNITED STATES PATENT OFFICE.

JAMES H. ALDRICH, OF OAKLAND, CALIFORNIA.

NUT-SHELLING MACHINE.

Application filed September 20, 1921. Serial No. 501,994.

*To all whom it may concern:*

Be it known that I, JAMES H. ALDRICH, a citizen of the United States, and a resident of Oakland, county of Alameda and State of California, have invented a new and useful Nut-Shelling Machine, of which the following is a specification.

My invention relates to a machine for shelling nuts of the hard shell variety such as those of the coquito palm and the like.

An object of the invention is to provide a machine which is capable of fracturing extremely hard shelled nuts with absolute positiveness.

Another object of the invention is to provide a nut shelling machine which may be adjusted so as to cause the complete fracture of both the shell and kernel, or merely the removal of the shell without mutilation to the kernel.

A further object of the invention is to provide simple means for distributing the fracturing force around the sides of the nut and for preventing the lateral displacement of the nut while said pressure is being exerted thereon.

A still further object of the invention is to provide a machine with a plurality of nut shelling units which will operate with comparative smoothness and with a minimum strain on the machine parts.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 3 is an enlarged vertical section taken through the pressure members showing the parts prior to their engagement with the nut.

Figure 4 is a view similar to Figure 3 showing the shell burst.

Figure 5 is a plan view of the machine equipped with a plurality of nut shelling units.

Figure 1:
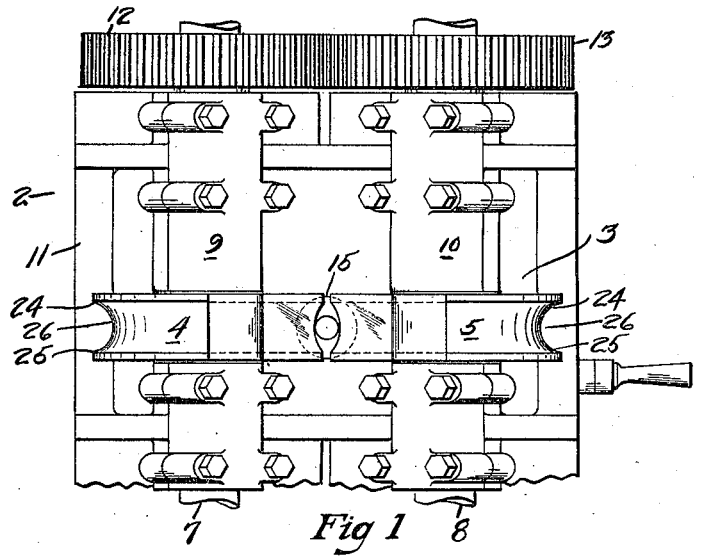
Figure 1 is a plan view of one unit of my machine.
Figure 2:
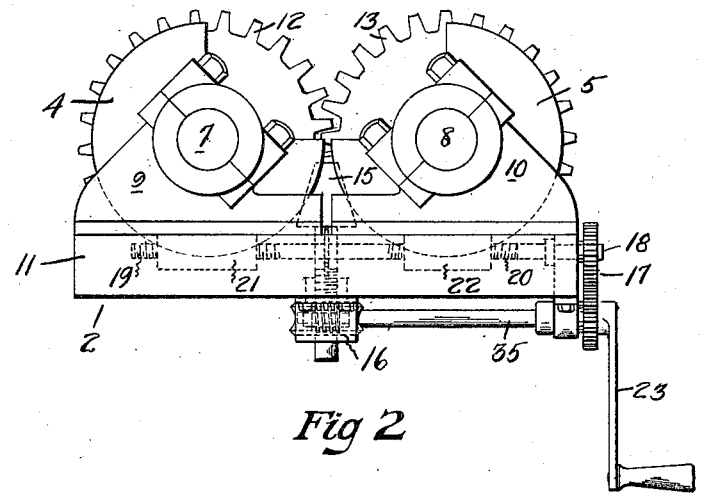
Figure 2 is an end view thereof.

Much difficulty has heretofore been encountered in shelling nuts of the coquito palm or the like, due to the structure and composition of the shell. The latter is very hard, tough and unyielding, besides being many times thicker than the shell of nuts of the more familiar species. The sides of the coquito nut are practically perfectly circular, thereby further aiding the shell in resisting external pressures. From the foregoing it will be clear that in order to fracture the shell a machine, unless of great size and power, must be capable of exerting a reasonable amount of force in a most effective manner.

Briefly expressed the machine here illustrated includes one or more shelling units each of which comprises a supporting member on which the nut is adapted to rest on an end, and a pair of eccentrically mounted rolls on opposite sides of the support and between the peripheries of which the nut is adapted to be engaged with a gradually increasing pressure until the shell bursts. The support and rolls are adjustable simultaneously for accommodating different sized nuts, or for varying the manner of shelling. The pressure is exerted by the rolls in a direction tending to retain the nut on the supporting member, and cooperating with the foregoing is means for preventing the lateral displacement of the nut. The rolls are designed to not only permit the nut to be readily placed in operative engagement between them, but to enable the broken particles of the shell to be readily released from the kernel after the shell has burst. Means are also provided for driving the various units simultaneously, however the units are arranged in such relation to each other that the maximum pressure exerted by the rolls of one unit will not occur simultaneously with such pressure of any of the other units.

A detailed description of the present form of the invention follows:

The machine 2 comprises one or more shelling units 3 each of which as here shown includes a pair of transversely spaced rolls 4 and 5 which are fixed more or less eccentrically on parallel shafts 7 and 8 respectively. The shafts are mounted in bearings 9 and 10 which are slidably positioned on the frame 11 so as to permit the adjustment of the rolls toward or from each other. A set of gears 12 and 13 are fixed on the shafts and connect them together, the gear teeth being comparatively long so as to allow the gears to remain in mesh for the various adjustments of the rolls. Driving of the machine may be effected by belt, a pulley 14 being fixed to one of the shafts for this purpose. Preferably arranged between the rolls of each unit and supported on the frame 11 is a nut supporting member or anvil 15 on which the nut is adapted to rest on end with its center substantially horizontally aligned with or slightly below the centers of the rolls. The anvil may be adjusted so as to vary the position of the nut with respect to the rolls, and in the present form of the invention said adjustment is adapted to be effected simultaneously with that of the rolls. As here shown a shaft 35 mounted in the frame 11 is connected to the anvil and to the bearing members by means of worm gearing 16 and the spur gearing 17 respectively. One of the gears 17 is fixed on a shaft 18 having reversely threaded portions 19 and 20 adapted to engage nuts 21 and 22 fixed to the members 9 and 10. The shaft 35 is provided with a crank handle 23 by means of which it may be rotated, and the various gears and threaded members are so related that rotation of the shaft 35 in one direction or another will cause the rolls and anvil to correspondingly approach or recede from each other. The portion of the anvil on which the nut rests is preferably recessed so that the nut may readily seat therein.

As will be clear by referring to Figures 3 and 4 the nut is adapted to lie positioned directly between the peripheries of the opposing rolls, and the direction of rotation of said rolls is such that the portions of the periphery approaching the shelling zone or the area in which the nut and anvil are included, pass the nut prior to the anvil. In this manner the sides of the nut will be engaged mediately of its ends, and a gradually increasing pressure exerted thereon tending to simultaneously crush the shell and hold the nut against the anvil. The arc included between the high and low points of the periphery of each roll is preferably about 90 degrees, and since the difference in the length of the radii at these points of the rolls is comparatively small, a powerful leverage is available for the transmission of the forces against the nut.

The high points of the rolls of one unit approach the nut at the same time so that the maximum pressure exerted against the nut occurs when said points both engage the nut.

Means are provided for causing the pressure exerted by the rolls to be distributed more or less uniformly over a maximum area of the sides of the nut rather than at two points, and thereby at the same time preventing the lateral displacement of the nut while engaged by the rolls. In the present embodiment of the invention said means is formed as a part of the rolls and comprises circumferential flanges 24 and 25 which define the peripheral groove 26 curved somewhat semi-spherical so as to permit the roller to engage a large segment of the nut sides. A suitable portion 27 of the periphery immediately forward to that portion thereof adapted to press against the nut is preferably concentrically disposed with respect to the center of rotation of the rolls, and the radius thereof is such as to enable the roll to just clear the sides of the shell. In this manner a nut dropped between the rolls from suitable feeding mechanism (not shown) will be readily guided to assume and retain the proper position on the anvil preparatory to the shelling operation.

In the operation of a shelling unit, a nut is first deposited on the anvil so that it rests in the position indicated in Figure 3, the position of the rolls and the anvil having been adjusted in accordance with the average size of nuts which are to be shelled. The eccentric portions of the peripheries of the opposing rolls then engage the sides of the nut with a gradually increasing pressure until the shell is fractured. Should it be desired to fracture both the shell and kernel, the machine is adjusted to bring the rolls in close relation; however if it is desired to shell the nuts and leave the kernel intact the adjustment is made whereby the high points of the rolls will clear the kernel as clearly indicated in Figure 4. Owing to the fact that the coquito nut shell is composed of a material of such an unyielding nature, and that in the ripening and seasoning of the nut there occurs a slight contraction of the kernel and a loosening thereof from the shell, the pressure exerted upon the nut by the rolls precipitates a bursting action of the shell rather than a crushing one. In this manner when the latter adjustment of the rolls prevails the fragments fly from the nut as soon as the shell is fractured and leave the kernel uninjured. As will be readily understood the bursting of the shell generally occurs just prior or at the time the high points of the peripheries of the rolls engage the nut, and in order that the broken particles of the shell may readily be released from the kernel a segment 29 of the roll rearwardly of the high point of the periphery thereof is removed.

The units as assembled in the machine, as shown in Figure 5, are positioned and operate in such relation to one another that the maximum pressure adapted to be exerted by the rolls of each unit never occurs at the same time such pressure is attained in any of the other units. In other words the bursting of the nuts, respectively associated with the units, occurs successively or in rotation. This feature is very desirable since the shocks are evenly distributed through each revolution of the machine, and furthermore enables the power to be more efficiently transmitted to the machine than if the maximum pressure was adapted to be exerted simultaneously in all of the units. A flywheel 28 is preferably fixed on one of the roll shafts so that the tendency toward the continuity of operation is further facilitated.

I claim:

1. A nut shelling machine comprising a stationary member upon which a nut is adapted to be supported on an end, and means exerting a gradually increasing pressure against substantially opposed points at the middle portion of the sides of the nut.

2. A nut shelling machine comprising a nut supporting member, and eccentric rolls arranged at opposite sides of said member adapted during their rotation to engage said nut with a varying pressure.

3. A nut shelling machine comprising a relatively stationary member adapted to support a nut on an end, and eccentric rolls arranged on opposite sides of said supporting member adapted to exert increasing pressure against the sides of the nut, said pressure having one force directed centripetally of the nut and another force substantially at right angles thereto directed toward the supported end of the nut.

4. A nut shelling machine comprising a relatively stationary member adapted to support a nut, eccentric rolls at the opposite sides of said member each adapted to simultaneously engage said nut, the direction of rotation of said rolls being such that the portions of the rolls approaching the area of the nut and support pass the nut prior to the support.

5. A nut shelling machine comprising eccentric rolls having their peripheries in opposed relation, and a relatively stationary member adapted to support a nut between said peripheries so that its center may lie in a line substantially intersecting the centers of rotation of said rolls.

6. A nut shelling machine comprising a set of eccentrically mounted transversely spaced rolls having their centers of rotation horizontally aligned, an anvil adapted to support a nut between the peripheries of said rolls so that it may be engaged thereby and its center placed in substantial alignment with said centers of the rolls, and means for holding the nut against lateral displacement while engaged by said rolls.

7. A nut shelling machine comprising an anvil adapted to support a nut on an end, eccentric rolls on opposite sides of said anvil having their centers of rotation substantially horizontally aligned with the center of the nut and arranged so that their peripheries may engage the sides of the nut with increasing pressure, means for preventing the lateral displacement of said nut while engaged by said rolls, and means for rotating said rolls.

8. A nut shelling machine comprising a vertically adjustable substantially stationary anvil adapted to support a nut on an end, eccentrically mounted rolls on opposite sides of said anvil having their centers of rotation substantially horizontally aligned with the center of the supported nut and arranged so that their peripheries may engage the sides of the nut with increasing pressure, means at the periphery of the rolls for preventing the lateral displacement of the nut while engaged thereby, and means for rotating said rolls in a direction such that the portions of the periphery approaching the area of the nut and anvil pass the nut prior to the anvil.

9. A nut shelling machine comprising a nut supporting member, and rolls mounted eccentrically at opposite sides of said member provided with peripheral portions having a circumferentially extending groove corresponding in shape to and adapted to engage said nut.

10. A nut shelling machine comprising a vertically adjustable anvil adapted to support a nut on an end, a pair of eccentrically mounted horizontally aligned rolls having grooved peripheral portions adapted to engage the sides of the nut with a gradually increasing pressure whereby the shell may be fractured, said anvil being adapted to position the nut whereby its center will be substantially horizontally aligned with the centers of rotation of said rolls, and means for rotating said rolls in a direction such that the portions of the periphery approaching the area of the nut and anvil pass the nut prior to the anvil.

11. In a nut shelling machine, means for supporting a nut, and a segmental revoluble element adapted to engage said nut with gradually increasing pressure until the shell bursts, said element being arranged to be disengaged from the nut subsequent to bursting of the shell whereby the broken particles of the latter may release themselves from the kernel.

12. A nut shelling machine comprising a vertically adjustable anvil adapted to support a nut on an end, a pair of eccentrically mounted rolls having a circumferentially grooved segment adapted to engage the sides of the nut with a gradually increasing pressure, whereby the shell may be fractured and being provided with a segmental opening positioned circumferentially immediately to the rear of said pressure segment, and means for rotating said rolls.

13. A nut shelling machine comprising a plurality of elements rotatable about a common axis, and elements adapted to pair with said first elements and mounted for rotation about an axis spaced from and parallel to said first axis, each pair of elements being adapted to engage a nut between them and exert a gradually increasing pressure thereon, the maximum pressure being applied by said pairs against the respective nuts in successive order.

In witness whereof I have hereunto set my hand at Oakland, California, this 12th day of September, 1921.

JAMES H. ALDRICH.